United States Patent [19]

Greiwe

[11] Patent Number: 5,133,983
[45] Date of Patent: Jul. 28, 1992

[54] ESPRESSO MACHINE AND METHOD OF MAKING ESPRESSO BY USING SAID MACHINE

[75] Inventor: Hansdieter Greiwe, Boxberg, Fed. Rep. of Germany

[73] Assignee: Patzner GmbH & Co., Fed. Rep. of Germany

[21] Appl. No.: 498,803

[22] Filed: Mar. 23, 1990

[30] Foreign Application Priority Data

Mar. 23, 1989 [DE] Fed. Rep. of Germany ....... 3909738

[51] Int. Cl.$^5$ .................. A47J 13/06; A47J 31/30
[52] U.S. Cl. .................... 426/433; 210/247; 210/413; 99/286; 99/289 R; 99/295
[58] Field of Search ............ 99/279, 289 R, 289 T, 99/289 D, 289 P, 295, 286, 294, 297, 298, 300; 210/359, 247, 413; 426/433, 431

[56] References Cited

U.S. PATENT DOCUMENTS 3,567,032  3/1971  Kemper .................. 210/413

FOREIGN PATENT DOCUMENTS

3316157  11/1984  Fed. Rep. of Germany .

*Primary Examiner*—Robert W. Jenkins
*Attorney, Agent, or Firm*—Eckert Seamans Cherin & Mellott

[57] ABSTRACT

An espresso machine is proposed which comprises an espresso-making filter (10) capable of being filled with coffee powder and having a sieve (11, 12) with openings (13) of defined cross-sections for retaining the coffee powder when espresso is being made. Means are provided for varying the cross-sections of the openings (13). These means are preferably configured as needles (21) divided along their lengths into at least two portions of different cross-sections so that the openings (13) formed in the sieve (11, 12) can be closed to a greater or lesser extent depending on the penetration depth of the needles (21).

23 Claims, 11 Drawing Sheets

ESPRESSO MACHINE AND METHOD OF MAKING ESPRESSO BY USING SAID MACHINE

The invention is directed to an espresso machine having an espresso-making filter into which coffee powder may be charged that includes sieves having a multiplicity of openings of defined cross-sections, so as to retain coffee powder while espresso is being made but permitting the passage of liquid, and providing varying means to vary the cross-sections of all of the openings.

Espresso machines are known in which a metered quantity of coffee powder is filled into a espresso-making filter including a filter bottom, the filter is positively engaged with a water supply means whereupon boiling water is passed therethrough to make the espresso. When a predetermined amount of water has passed through the filter the latter is removed manually and the filter cake is removed by knocking it out before fresh coffee powder can be introduced. With such a machine it is impossible to automatize the espresso making operation. Furthermore there exists the problem that the filter sieve must repeatedly be cleaned by hand so as to prevent clogging of the fine openings formed therein.

Based on the prior art mentioned above it is the object of the present invention to improve an espresso machine of the specified kind so that a plurality of espresso portions can be made by automatic control means.

The specified object is solved by an espresso machine having an espresso-making filter with sieves having a number of openings of defined cross-sections and providing means to vary the cross-sections of all of the openings. As regards the method, the specified object is solved by the method of making espresso by an espresso machine having an espresso making filter with sieves having a number of openings of defined cross-sections and providing means to vary the cross-sections of all of the openings.

It is an essential aspect of the invention that the filter sieve includes openings with variable cross-sections. It is thereby ensured that a small cross-sectional area can be selected while water is forced therethrough so that the coffee powder is safely retained therein. Following the espresso-making operation the filter cake is discharged and the cross-section of the holes is enlarged so that any remains and, if applicable, also the entire filter cake may be flushed out through the enlarged openings. It is only by this feature that espresso can be made automatically.

It is preferred that needles are provided which can be pushed into the openings of the filter sieve to vary the cross-sections thereof, said needles being shaped so that the openings are closed to a greater or lesser extent depending on the depth of insertion of the needles. When the needles have a shank with a diameter which is only slightly smaller than that of the openings, coffee particles can reliably be removed from the openings. Preferably, the end portions of the needles are tapered or flattened. Furthermore, the needles preferably include a reduced-diameter portion so that especially at the commencement of the espresso-making operation they may be pushed deeply into the coffee powder while at the same time there remains a small-diameter annular opening between the needles and the sieve so that the espresso may be ejected therethrough. When the espresso has been made the needles are retracted to such an extent that their tips remain in the openings to thereby define the desired cross-section thereof, while due to the usual compacting there remain voids in the coffee which facilitate passage of the filter cake therethrough.

The needles are preferably secured to a common support guided relative to the sieve so that not more than two parts have to be moved relative to each other.

It is possible to fill the espresso-making filter, to make the espresso and to discharge the filter cake all in one and the same position. What is important in this connection merely is that no remains of the filter cake get into the freshly made espresso, and this may be achieved, for instance, by corresponding valve means. In a preferred embodiment of the invention the espresso-making filter is mounted two on a holding member for movement in such a way that it can be reciprocated or rotated between at least two positions, the espresso-making operation being effected in one of said positions. It is preferred that the fresh coffee powder is introduced in a further position, while the filter cake is removed in a third position.

For removing the filter cake the same is advantageously lifted from the filter either by means of the sieve, which is movably disposed therein, or by means of the needles, whereafter the filter cake is cleared away with a pusher or the like.

Preferably, the sieve is moved by way of elevating pins or the like which are sealingly supported and adapted to be moved from outside. These elevating pins may also constitute parts of valve means for blocking a flushing conduit for flushing away any coffee remains. A further valve is provided for blocking the espresso outlet port, and this valve may be positively coupled with the sieve so that in the elevated position of the sieve for discharging the filter cake the espresso outlet port is closed.

Further preferred embodiments of the invention will be from the subclaims and from the following explanation of examples which will be described in detail with reference to the drawings, in which:

Figure 1:
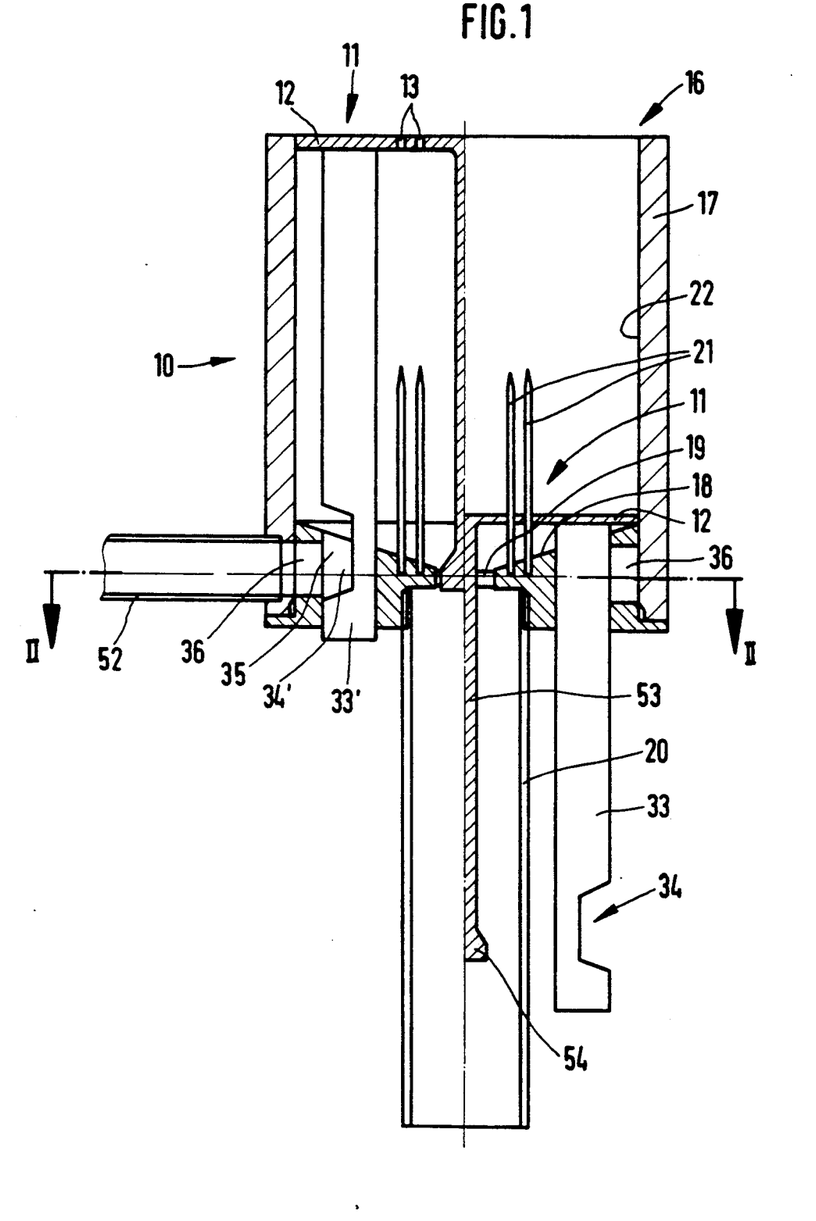
FIG. 1 is a longitudinal section through a first preferred embodiment of the invention in two positions of the filter sieve.
Figure 2:
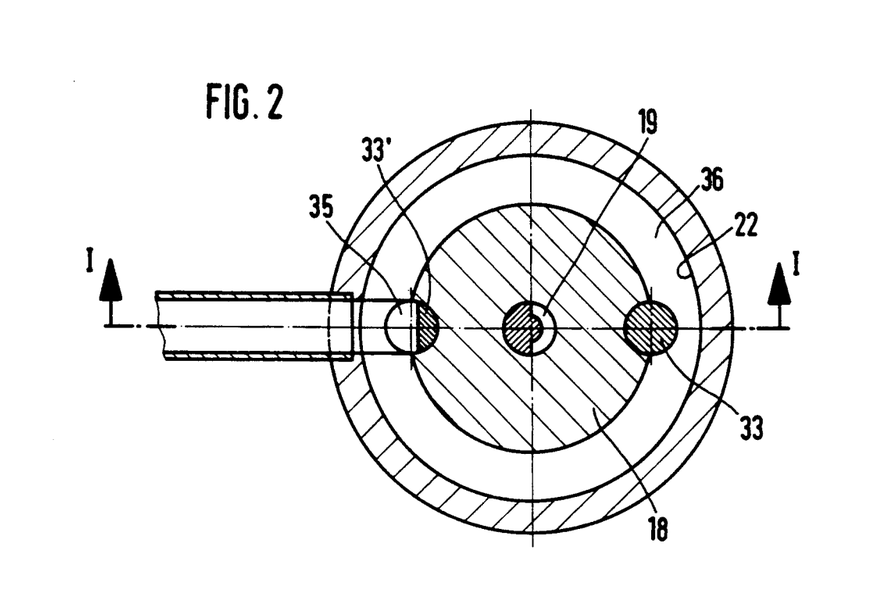
FIG. 2 is a cross-section along the line II—II of FIG. 1.

In the first preferred embodiment of the invention as illustrated in FIG. 1 the espresso-making filter 10 comprises a sieve 11 formed by a sieve bottom 12 having holes 13 to form sieve openings. The sieve 11 is disposed movably and in substantial sealing engagement with a sidewall 22 in a cup-shaped needle holder 17. The needle holder 17 has a bottom into which ends of needles 21 are press-fitted. The bottom 18 slopes down conically towards the center thereof and includes a central concentric outlet port 19. Furthermore, the bottom 18 is provided with laterally offset and diametrically opposed bores 35 the longitudinal axes of which are parallel to the center axis of the cup-shaped needle holder 17.

The bottom 18 of the needle holder 17 is formed with a continuous annular groove 36 which communicates the bores 35 with each other and into which a flushing conduit 52 opens via a radially extending bore.

The bores 35 have elevating pins 33, 33' sealingly fitted therein, the one ends of said elevating pins projecting outwardly while the other ends may abut the bottom 12 of the sieve 11. It is also possible to positively engage the elevating pins 33, 33' with the bottom 12 of the sieve 11.

The end portions of the elevating pins 33, 33' are formed with notches 34, 34' which are provided and dimensioned as to their length in such a way that, when the elevating pins 33, 33' lift the sieve 11 right to the top edge 16 of the needle holder 17, the interior of the needle holder 17 is in communication with the groove 36 via the notches 34, 34' so that liquid can flow from the interior of the needle holder 17 into the flushing conduit 52 via the notches 34, 34' and the annular groove 36.

Moreover, the sieve 11 includes a valve rod 53 centrally mounted on the sieve bottom 12 and carrying a valve body 54 at its end. The diameter of the valve body 54 is selected for substantially sealing insertion in the outlet port 19 to close the same in liquid-tight fashion. The length of the valve rod 53 is selected so that the outlet port 19 is closed when the sieve bottom 12 is lifted (left side of FIG. 1).

An outlet conduit 20 is fitted in the bottom 18 of the needle holder 17 and concentrically surrounds the valve rod 53 with its valve body 54 at the end, the espresso passing through said outlet conduit into a cup placed thereunder.

It will be apparent from the above explanation that the outlet port 19 is closed by the valve 53, 54 when the interior of the needle holder 17 is in communication with the flushing conduit 52 via the notches 34, 34', while in this condition the top surface of the sieve bottom 12 is substantially flush with the upper edge 16 of the needle holder 17. In the lowered position of the sieve 11 the interior of the needle holder 17 communicates with the outlet conduit 20 via the port 19.

Figure 3:
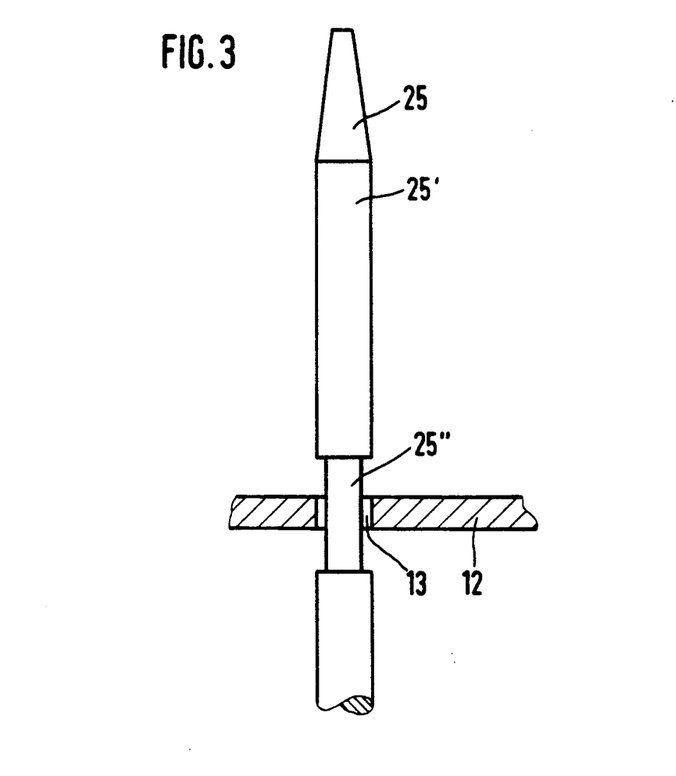
FIG. 3 is a partial longitudinal section through a filter sieve with a needle inserted therethrough.

FIG. 3 illustrates in detail a preferred embodiment of a needle 21. Such a needle 21 comprises a needle shank 25' having a tapered needle end portion 25. In its lower part the needle shank 25' comprises a reduced-diameter portion 25" which is dimensioned so that upon insertion of a needle 21 into an opening 13 of the sieve bottom 12 an annular space will remain through which liquid may flow while it is sufficiently narrow to retain coffee particles. When the sieve 11 is displaced upwardly (FIGS. 1 and 3) to such an extent that the tapered needle end portion 25 is at the level of the opening 13, an annular passageway for liquid is also defined, the gap width of said annular passageway being selected so that coffee particles are reliably retained.

Below, the various method steps for making espresso will be explained with reference to FIG. 4.

Figure 4A:
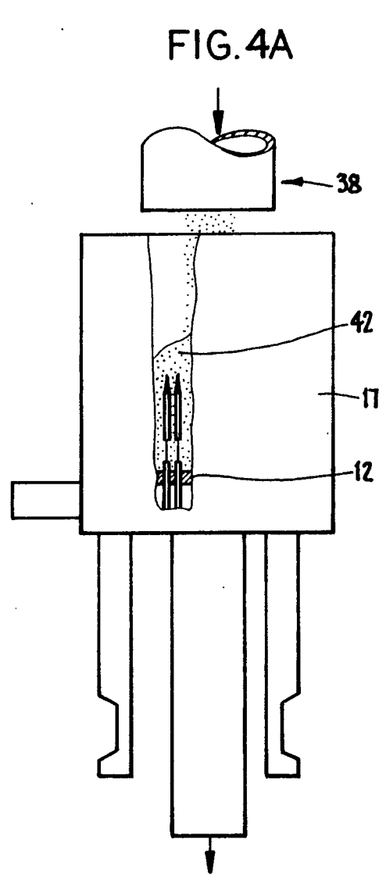
FIGS. 4a to 4e illustrate various positions of an espresso-making filter as shown in FIGS. 1 and 2 while espresso is being made.

In a first step a the sieve 12 is in its lowermost position. In this position coffee powder 42 is charged through charging means 38 into the hollow space inside the needle holder 17. In this condition the openings in the sieve bottom are completely closed.

Figure 4B:
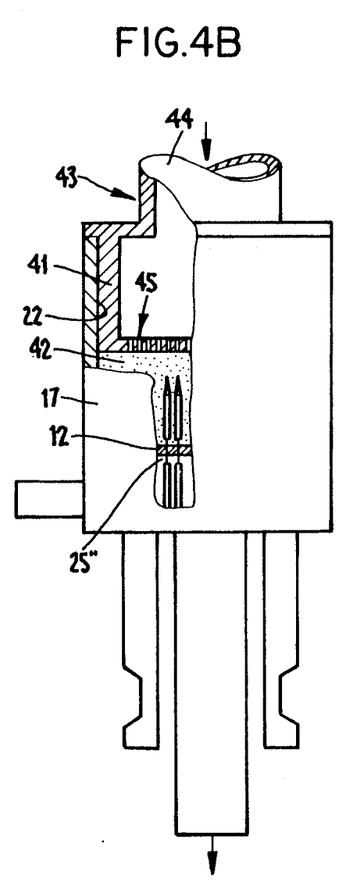

In a second step b a scalding attachment 43 is placed on the needle holder 17. The scalding attachment 43 comprises a hollow cylindrical body 41 closed at one end by a sieve bottom 45 and being communicated at the other end with a feed conduit 44. The cylindrical body 41 or the sieve bottom 45 respectively are dimensioned so that a relatively intimate engagement of the structure with the sidewall 22 of the needle holder 17 is ensured. The dimensions are selected such that, when the scalding attachment 43 is placed on the needle holder 17, the sieve bottom 45 of the scalding attachment 43 slightly compacts the charged coffee powder 42. In the method step b illustrated in FIG. 4 the sieve bottom 12 is now elevated until its openings 13 are in the vicinity of the reduced-diameter portions 25". In this state a predetermined quantity of boiling water is supplied to the coffee powder 42. It is also possible to conduct this initial supply of boiling water while the openings 13 are substantially closed, in which case the sieve bottom 12 is supported either somewhat higher or somewhat lower.

Figure 4C:
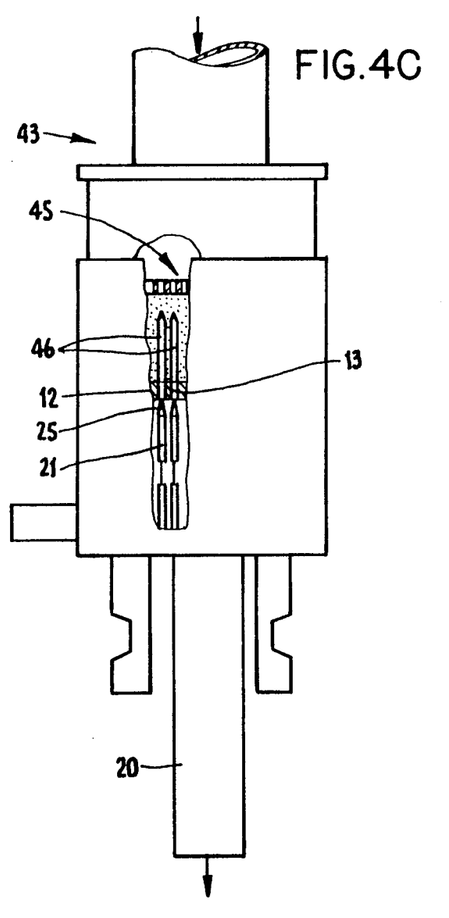

During the further espresso-making operation the sieve bottom 12 is elevated in a third step c while at the same time the scalding attachment 43 is preferably retracted from the interior of the needle holder 17 by a corresponding distance. In this condition the tapered end portions 25 of the needles 21 are at the level of the openings 13 so that a filtering gap will remain. Due to the fact that the needles 21 have been retracted there remain a number of voids 46 in the (at least initially scalded) coffee powder which correspond to the number of needles 21, through which voids the produced filter cake can easily flow.

Figure 4D:
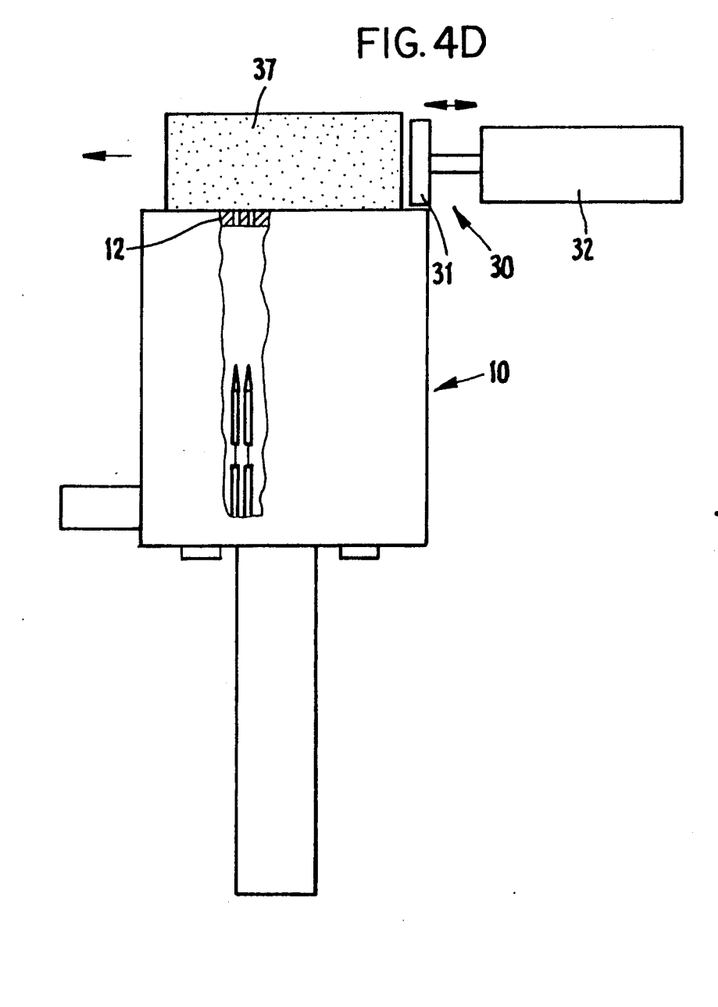
Figure 4E:
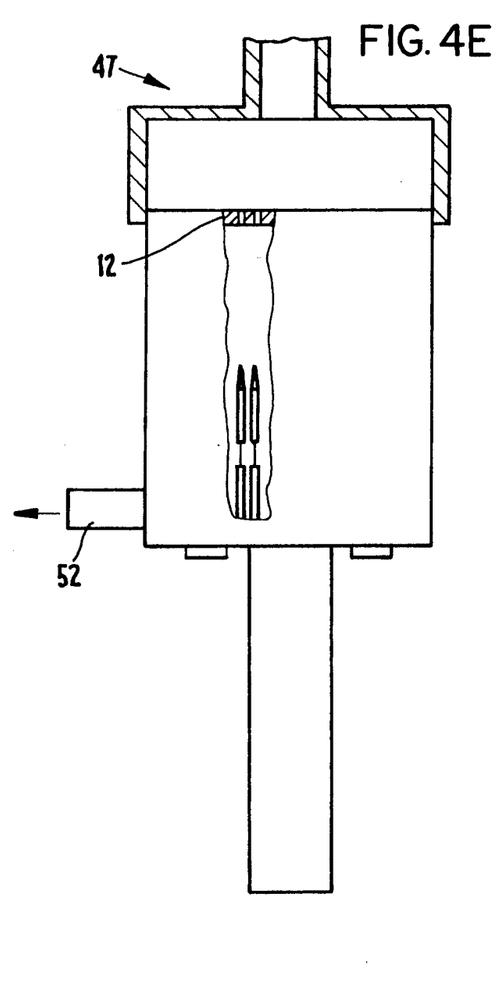

When the espresso-making operation is completed, the sieve bottom 12 together with the filter cake 37 is lifted upwardly in a fourth step d. As soon as this end position has been reached a removing means 30 is actuated which includes a pusher 31 adapted to be displaced by means of a cylinder 32 perpendicularly to the center axis of the espresso-making filter 10 so as to push the filter cake 37 from the top of the sieve bottom 12 into a discharge chute (not illustrated). Following the removing operation of step d, a flushing unit 47 is placed on the espresso-making filter 10 in a step e. By way of this flushing unit 47 flushing water (or flushing steam) for finally clearing away any remaining coffee particles is introduced into the apparatus and discharged through the flushing conduit 52 into an outlet (not illustrated). Thereafter a fresh filling step (step a) can be performed.

Lifting and lowering of the sieve bottom 12 is performed by non-illustrated electromechanical or pneumatic lifting means acting on the elevating pins 33, 33'. The same holds for lifting and lowering of the scalding attachment 43 and the flushing unit 47.

The method steps b and c may be repeated several times during a single espresso-making operation so that fresh voids 46 are repeatedly opened to facilitate filtering and the openings 13 in the sieve bottom 12 are cleared.

The previously described method steps may be performed with an arrangement in which the espresso-making filter 10 (or the needle holder 17, respectively) is fixedly mounted. Of course, it is also possible to displace the filter 10 either horizontally or vertically so as to bring it into different positions for the various method steps. In the modification illustrated in FIG. 5 the filter 10 is rotated in a vertical plane so that for method step a (charging) the filter can be turned beneath a correspondingly configured charging unit 38 with a metering means 39 mounted (fixedly) thereabove, so that a proper quantity of coffee from a storage container 40 can be fed into the filter. In the vertical position of the filter 10 the method steps b and c are conducted. In the position shown in FIG. 5, where the filter is pivoted to the left, the filter cake 37 is removed by the removing means 30 to a discharge chute 48 (step d), whereupon a non-illustrated flushing unit 47 is placed on the filter 10 to flush the same (step e) and the flushing water is passed to an outlet 50.

Figure 6:
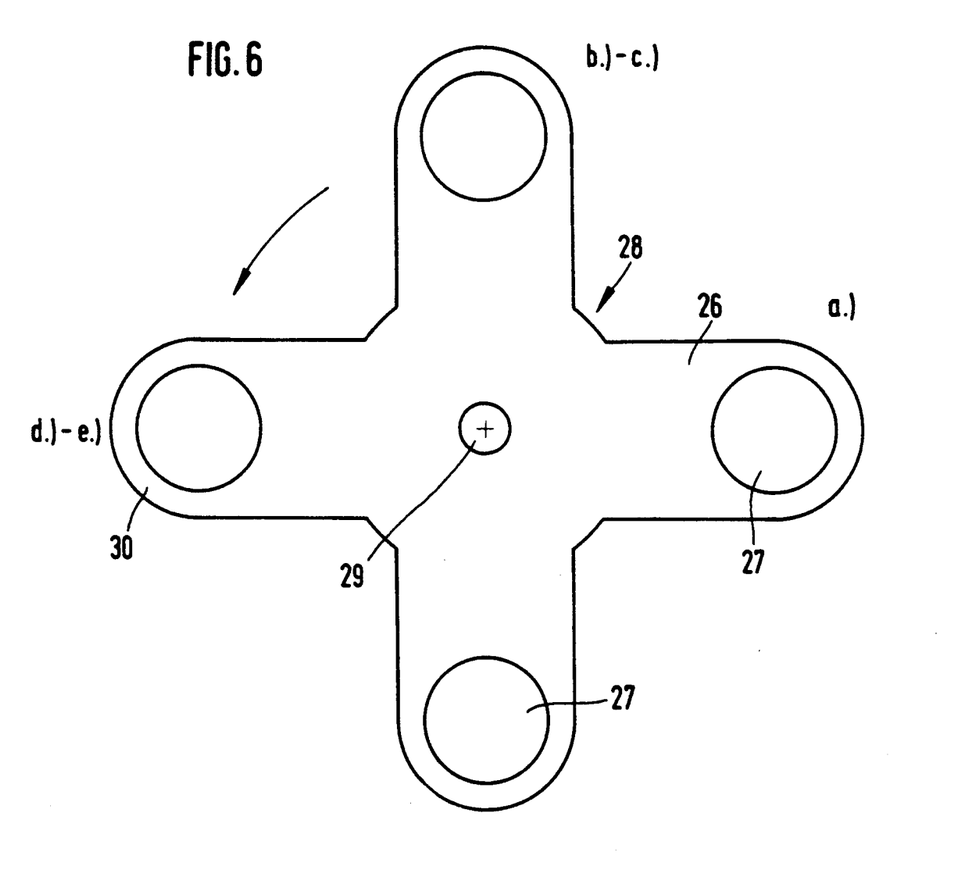
FIG. 6 is a plan view showing a holding member for accommodating a total of four espresso-making filters.

In the further embodiment of the invention illustrated in FIG. 6 a plurality of coffee-making filters 10 (four filters are illustrated) are mounted in recesses 27 in supporting arms 26 of a holding member 28 which is rotatable about a vertical shaft 29. With this arrangement the removing means 30 may be stationary so that the filter cake is removed when the holding member 28 is turned. It is an essential advantage of this arrangement that the cycle time for making expresso is shortened.

Figure 5:
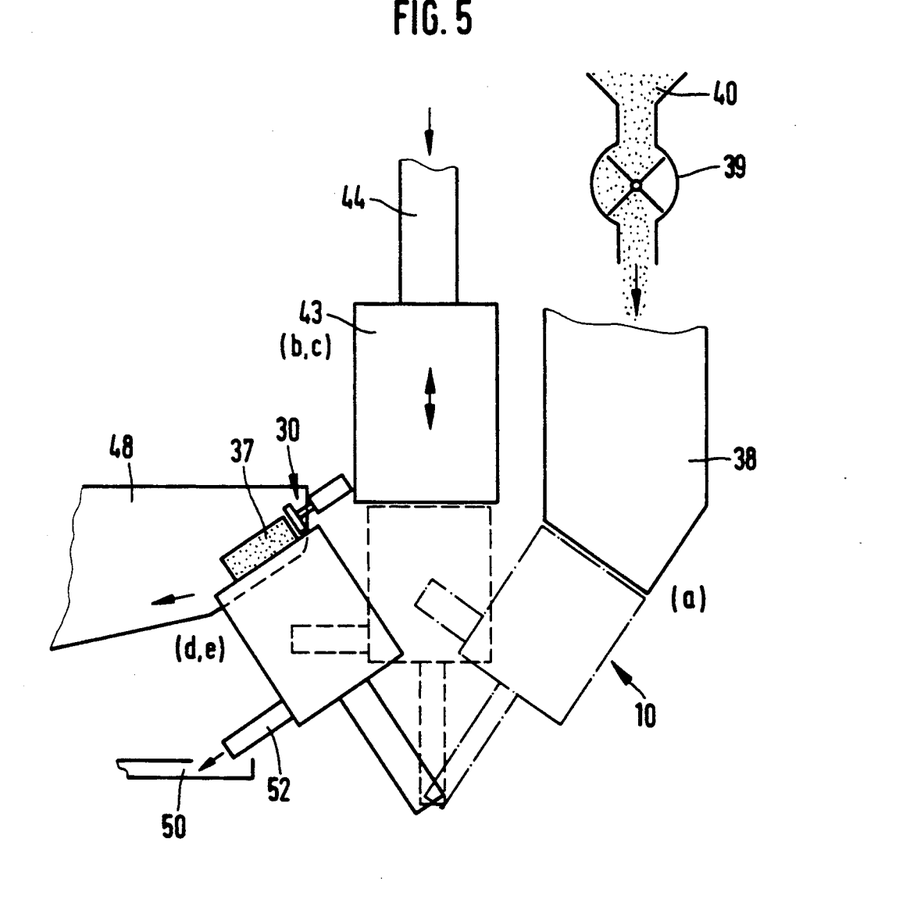
FIG. 5 is a schematic side view of an espresso machine in which three different operating positions are illustrated.

In a further embodiment of the invention, which has not been illustrated, the principles of movement according to FIGS. 5 and 6 have been combined. In particular, with this embodiment of the invention the espresso-making filter 10 is tilted or turned downwards by 180° for removing the filter cake 37 so that no separate removing means 30 is required, as the filter cake 37 is conveyed to a disposal chute provided therebeneath by a corresponding (preferably abrupt) movement of the sieve 11. Flushing may then be performed direct through the outlet conduit 20 so that a separate flushing conduit 52 is not required and consequently the valve means for opening and closing the flushing conduit 52 and the outlet port 19 may be omitted.

It will be apparent from the above explanations that the relative movement between the needles 21 and the bottom 12 of the sieve 11 constitutes an essential feature of the invention. In accordance with another embodiment of the invention illustrated in FIGS. 7 and 8, this movability may also be achieved in a way other than by the previously described lifting pins 33, 33'. In this embodiment the sieve 11 has cup-like configuration, the sieve forming the bottom 12 of the cup. At the top edge the sieve 11 is provided with radially outwardly projecting flanges 15, 15' used for retaining the espresso-making filter 10 in a recess 27 in the supporting arm 26.

Figures 7, 9, 10, 11, 12:
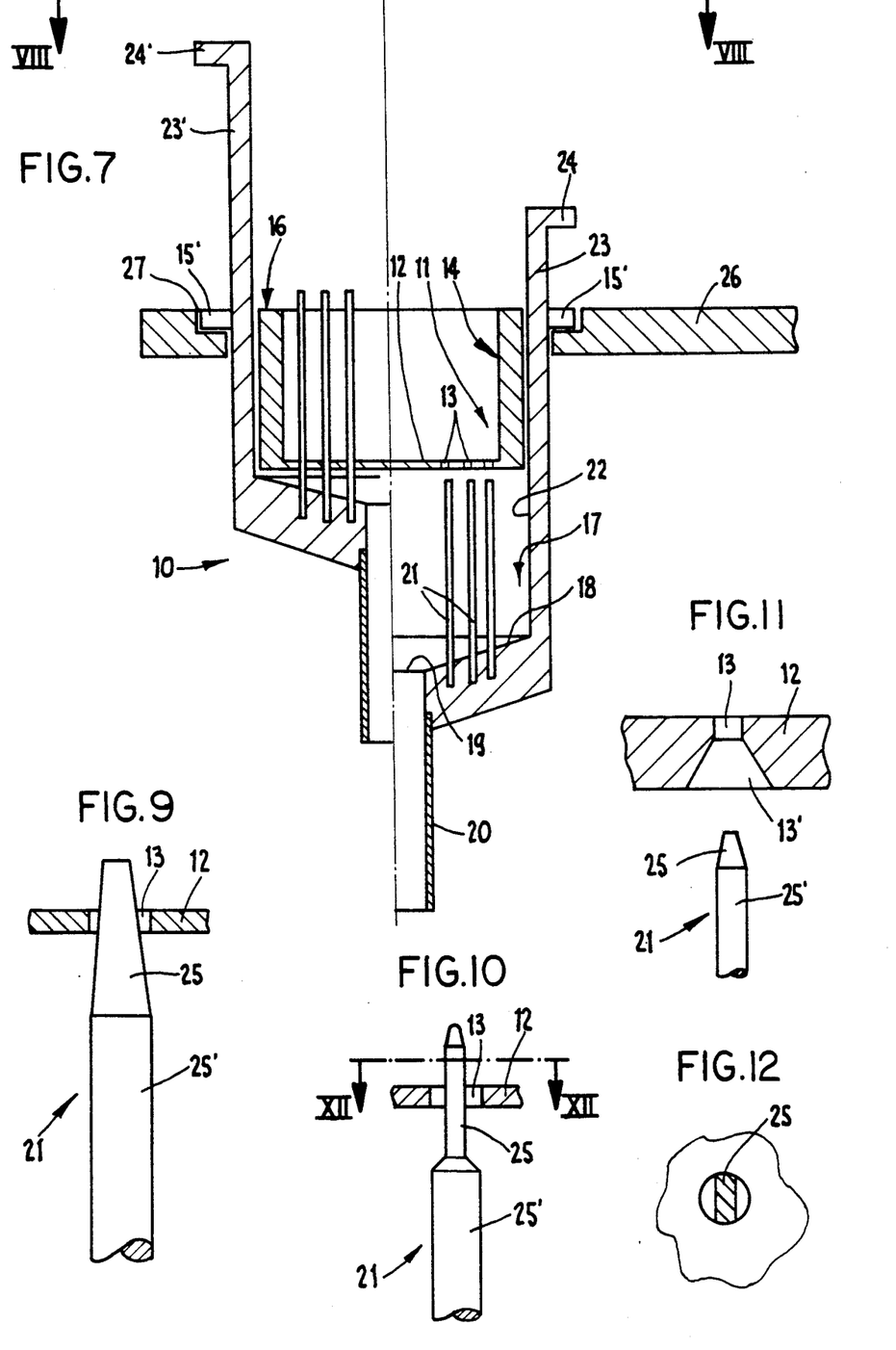
FIG. 7 is a sectional view similar to FIG. 1 for explaining another embodiment of the invention.
FIGS. 9 to 11 are various cross-sections through filter sieves with needles fitted therein.
FIG. 12 is a section along the line XII—XII of FIG. 10.
Figure 8:
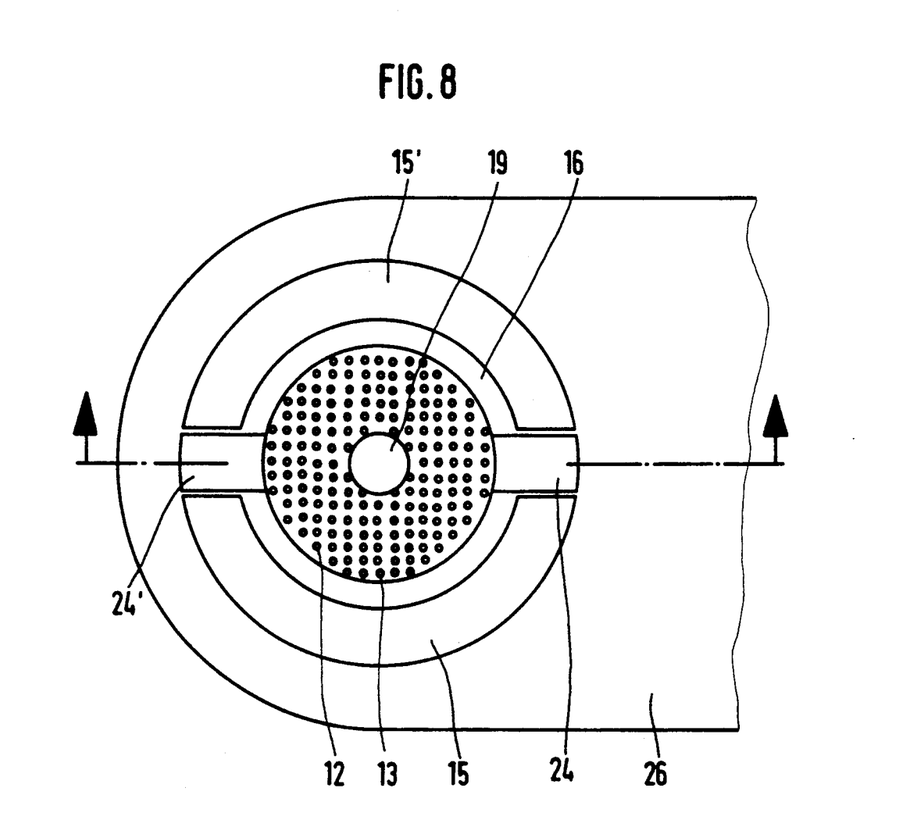
FIG. 8 is a section along the line VIII—VIII of FIG. 7.

The needle holder 17 is provided with upwardly projecting extensions 23, 23' formed with actuating flanges 24, 24' at their ends. With this arrangement it is not the sieve 11 but rather the needle holder 17 that is lifted. Ejection of the filter cake is effected by corresponding further lifting of the needles 21 which due to their large numbers are capable of lifting the compacted filter cake without breaking it.

The FIGS. 9 to 11 illustrate further preferred embodiments of the needles 21. FIG. 9 illustrates the already described modification in which the end portions 25 of all of the needles 21 are tapered. In the embodiment illustrated in FIG. 10 (FIG. 12 is a horizontal section) the end portions 25 of the needles 21 are flattened so that there remain two filtering gaps of circular segment-like cross-sections. In this modification the filtering gaps are therefore not defined by the relative position between needle end portion 25 and opening 13 but are defined by the shape of the end portion 25.

In order to facilitate insertion of the needle end portions 25 into the openings 13 it is advantageous when—as illustrated in FIG. 11—the lower portions of the openings 13 are formed as outwardly flared tapering portions 13'.

Figure 13:
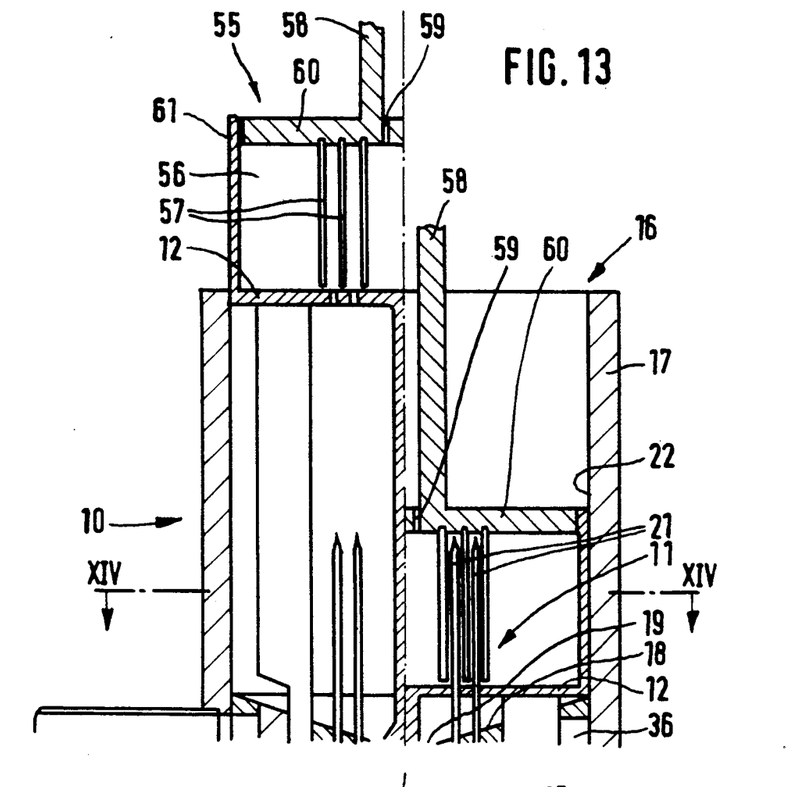
FIG. 13 is a section through another preferred embodiment of the invention similar to that shown in FIG. 1, in which comminuting means are provided.

FIG. 13 illustrates a further embodiment of the invention, in which a charging unit 55 is formed above the sieve bottom 12 comprising a wall 61 above the sieve bottom 12 and a lid 60 which is movable (vertically) relative to the sieve bottom 12. The lid 60 includes a conduit 58 through which boiling water may be introduced into the space 56 via an inlet port 59.

Moreover there are provided comminuting elements 57 which depend downwardly from the lid 60 in the direction towards the sieve bottom 12. The comminuting elements 57 are positioned at such an offset with respect to the needles 21 (see FIG. 14) that the lid 60 can be rotated relative to the sieve bottom 12 about the longitudinal axis of the overall apparatus whereby the comminuting elements 57 may pass between the needles 21.

Figure 14:
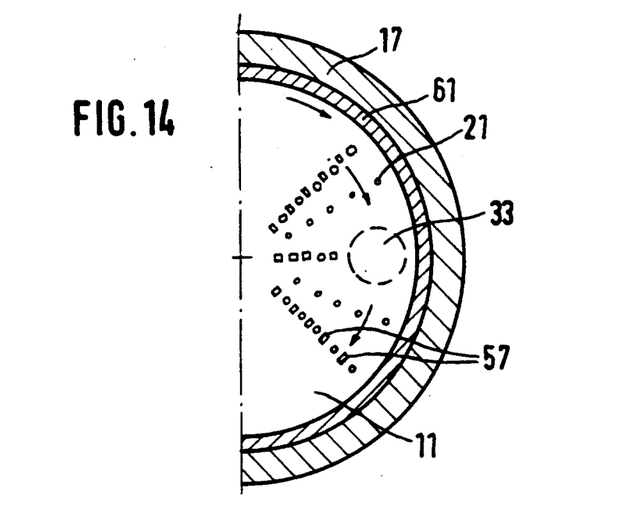
FIG. 14 is a section along the line XIV—XIV of FIG. 13.

In this embodiment of the invention coffee beans instead of coffee powder are charged into the space 56 which is then closed by the lid 60. The entire arrangement (sieve bottom 12, lid 60) is now lowered towards the needles 21 so that these penetrate through the openings of the sieve bottom into the inner space 56 to break or split the coffee beans. It is possible to perform this movement several times in succession as an up-down movement so that the needles 21 will comminute the beans in the space 56 into small fractions. Furthermore, the lid 60 may be rotated relative to the sieve bottom 12 so that the comminuting elements 57 will pass between the needles 21 to further reduce the size of the coffee bean fractions. Then the espresso-making operation may be performed as usual.

Figure 15:
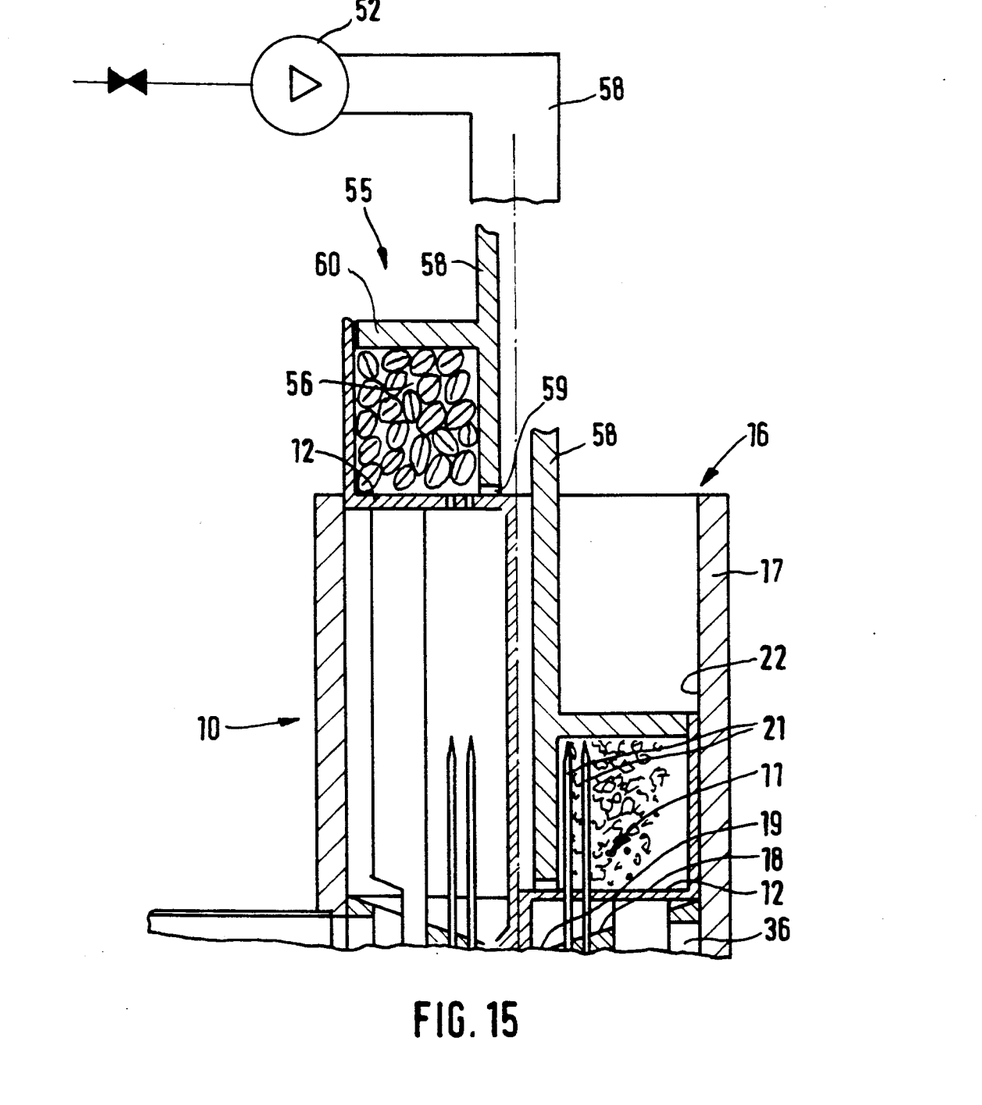
FIG. 15 is a further embodiment of the invention similar to that illustrated in FIG. 13.

The embodiment illustrated in FIG. 15 is not provided with separate comminuting elements. Here, comminution is performed exclusively be the needles 21.

As will be apparent from FIG. 15, the supply of boiling water may be through the conduit 58 and the inlet port 59 by means of a pump 52. It would be highly advantageous to have the pump 52 designed as a high-pressure pump for feeding scalding water at increased pressure of preferably more than 50 bars, but especially more than 100 bars. This high-pressure coffee-making operation is highly advantageous especially when there is no coffee powder but—as described above—merely coarse coffee particles are provided. Due to the high pressure, which may optionally be applied oscillatingly (i.e. recurrently increasing and decreasing), it is possible to extract an increased amount of flavour from the coffee.

Figure 16:
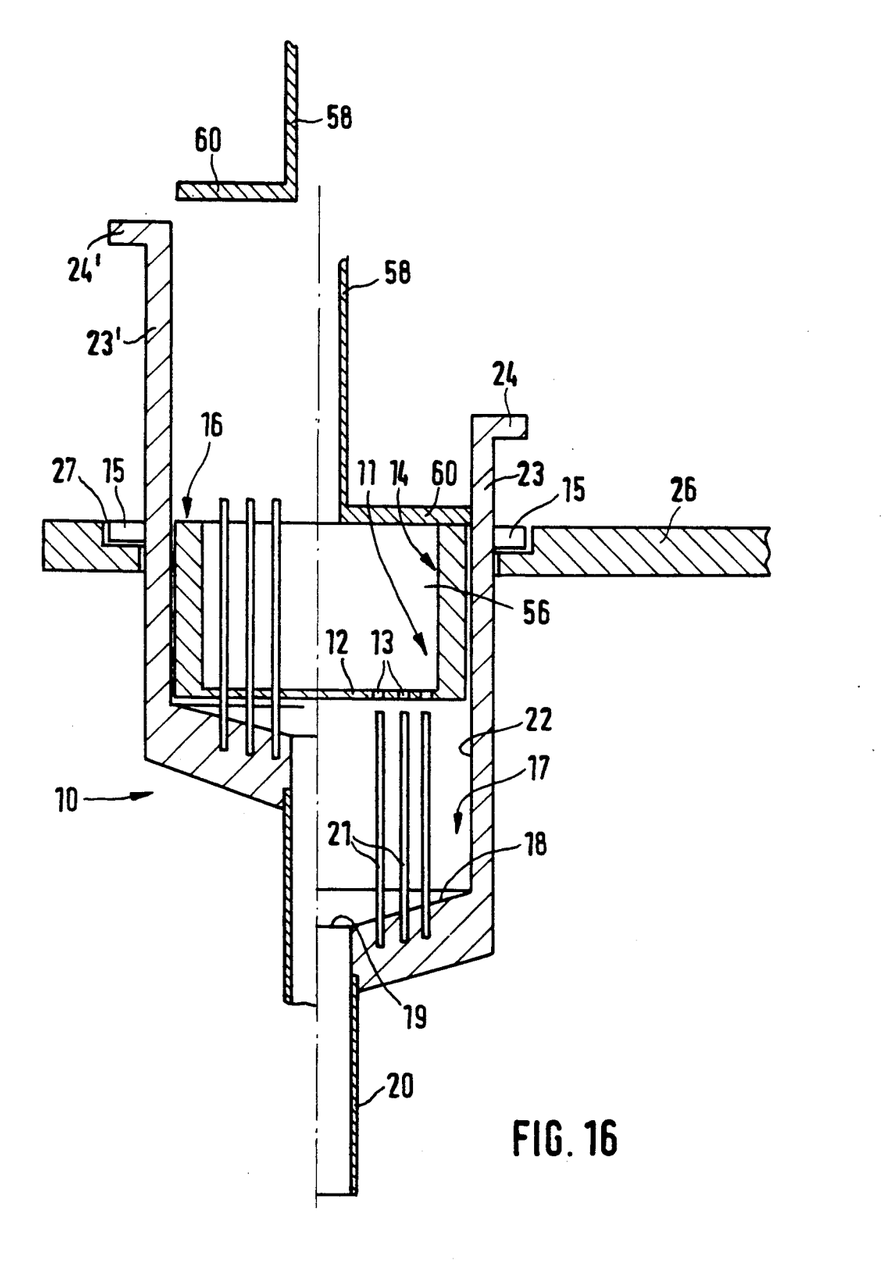
FIG. 16 is a further embodiment including comminuting means similar to those of FIGS. 13/15.

The embodiment of the invention illustrated in FIG. 16 is similar to that of FIG. 7, but it is also equipped with a lid 60 and a pipe fitting 58 provided thereon. Here, too, a "grinding operation" can be effected by repeatedly pushing the needles 21 into the interior space 56. Here, too, a high-pressure pump is also provided to deliver boiling water.

I claim:

1. Espresso machine comprising an espresso-making filter into which coffee powder may be charged, said filter including a sieve having a multiplicity of openings of defined cross-sections so as to retain the coffee powder while espresso is being made but permitting the passage of liquid therethrough, wherein means are provided for varying the cross-sections of all of said openings.

2. Espresso machine as claimed in claim 1, wherein said means for varying the cross-sections comprise needles adapted to be pushed into said openings, said needles being divided along their lengths into at least two portions of different cross-sections so that the cross-sections of the openings formed in the sieve can be reduced to a greater or lesser extent depending on the depth of penetration of the needles.

3. Espresso machine as claimed in claim 2, wherein each of said needles comprises at least a portion whose cross-section corresponds substantially to that of the openings so that, when the needles are pushed into the openings, coffee particles retained therein are pushed out.

4. Espresso machine as claimed in claim 2, wherein the end portions of said needles have tapering or flattened configuration.

5. Espresso machine as claimed in claim 2, wherein the needles have reduced-diameter portions in the region of their shanks.

6. Espresso machine as claimed in claim 2, wherein all of the needles are mounted on a common needle holder beneath the sieve, said needle holder being displaceable relative to the sieve either towards the needles or vice versa.

7. Espresso machine as claimed in claim 6, wherein means are provided for guiding the sieve within the needle holder.

8. Espresso machine as claimed in claim 6, comprising lifting pins which are sealingly guided by the needle holder and are adapted to be actuated from outside for moving the sieve relative to the needle holder.

9. Espresso machine as claimed in claim 2, wherein means are provided for fully withdrawing the needles from the openings to completely expose the same, and for reinserting said needles.

10. Espresso machine as claimed in claim 2, wherein removing means is provided for removing a filter cake.

11. Espresso machine as claimed in claim 1, wherein holding means are provided for movably holding the filter in a holding member so that it may be reciprocated or pivoted between at least two positions, means being provided for supplying water for the espresso-making operation in one position and means being provided for introducing coffee powder and for removing a filter cake, respectively, in at least one further position.

12. Espresso machine as claimed in claim 11, wherein plural espresso-making filters are disposed in the holding means.

13. Espresso machine as claimed in claim 1, comprising a flushing conduit having first valve means and second valve means for blocking an espresso outlet port.

14. Espresso machine as claimed in claim 13, wherein said first and second valve means are fixedly connected with each other for being opened alternatively.

15. Espresso machine as claimed in claim 1, comprising holding means for charging coffee beans into a space above the sieve and comprising comminuting means for comminuting the coffee beans in said space prior to scalding the same.

16. Espresso machine as claimed in claim 15, wherein said comminuting means comprise said needles and/or additional comminuting elements which are movable relative to the sieve and/or the needles.

17. Espresso machine as claimed in claim 15, comprising a high-pressure pump by means of which water for espresso-making can be maintained at increased pressure inside the space containing comminuted coffee beans.

18. A method of making espresso comprising the steps of:
charging coffee powder into an espresso-making filter, said filter including a sieve having a multiplicity of openings of defined cross-sections so as to retain the coffee powder while espresso is being made but permitting the passage of liquid therethrough, wherein said cross-sections are variable by varying means;
varying the cross-sections, wherein said step of varying comprises pushing needles adapted to be pushed into said openings, said needles being divided along their lengths into at least two portions of different cross-sections so that the cross-sections of the openings formed in the sieve can be reduced to a greater or lesser extent depending on the depth of penetrations; and,
supplying water to said espresso-making filter.

19. The method as defined by claim 22, further comprising the steps of:
pushing the needles into the coffee powder temporarily and retracting said needles, either before or during espresso making, thereby defining drainage voids.

20. The method as defined by claim 18, further comprising the steps of:
maintaining the water at increased pressure by a pump while espresso is being made.

21. The method as defined by claim 18, further comprising the steps of
charging coffee beans into a space above the sieve; and
comminuting the coffee beans by comminuting elements, thereby providing coffee powder.

22. The method as defined by claim 21 wherein said step of comminuting coffee beans comprises recurrently reciprocating the comminuting elements into the coffee beans.

23. The method as defined by claim 22, wherein said step of comminuting the coffee beans is carried out by said needles.

* * * * *

UNITED STATES PATENT AND TRADEMARK OFFICE
CERTIFICATE OF CORRECTION

PATENT NO. : 5,133,983
DATED : July 28, 1992
INVENTOR(S) : Hansdieter Greiwe

It is certified that error appears in the above-identified patent and that said Letters Patent is hereby corrected as shown below:

Column 2, line 15, delete "two".

Column 8, line 38, replace "22" with --18--.

Signed and Sealed this

Twenty-first Day of September, 1993

Attest:

BRUCE LEHMAN

Attesting Officer

Commissioner of Patents and Trademarks